United States Patent
Van Nostrand et al.

(10) Patent No.: US 9,818,379 B2
(45) Date of Patent: Nov. 14, 2017

(54) PIXEL DATA TRANSMISSION OVER MULTIPLE PIXEL INTERFACES

(71) Applicant: NVIDIA Corporation, Santa Clara, CA (US)

(72) Inventors: Mark Van Nostrand, Dripping Springs, TX (US); Sirish Kumar Muthyala, Hyderabad (IN); Seshi Prasad Veerapally, Hyderabad (IN); Kamala Ramachandruni Venkata, Hyderabad (IN)

(73) Assignee: Nvidia Corporation, Santa Clara, CA (US)

( * ) Notice: Subject to any disclaimer, the term of this patent is extended or adjusted under 35 U.S.C. 154(b) by 493 days.

(21) Appl. No.: 13/962,347

(22) Filed: Aug. 8, 2013

(65) Prior Publication Data

US 2015/0042626 A1 Feb. 12, 2015

(51) Int. Cl.
| | | |
|---|---|---|
| *G09G 3/36* | (2006.01) | |
| *G09G 5/395* | (2006.01) | |
| *G09G 5/00* | (2006.01) | |
| *H04L 29/06* | (2006.01) | |

(52) U.S. Cl.
CPC ............ *G09G 5/395* (2013.01); *G09G 5/006* (2013.01); *H04L 29/06176* (2013.01); *G09G 2310/0224* (2013.01); *G09G 2350/00* (2013.01)

(58) Field of Classification Search
CPC .............. G09G 5/395; G09G 5/006; G09G 2310/0224; G09G 2350/00; H04L 29/06176
USPC .......................................................... 345/89
See application file for complete search history.

(56) References Cited

U.S. PATENT DOCUMENTS

| | | | |
|---|---|---|---|
| 4,145,685 A | 3/1979 | Farina | |
| 4,603,400 A | 7/1986 | Daniels | |
| 4,955,066 A | 9/1990 | Notenboom | |
| 5,016,001 A | 5/1991 | Minagawa et al. | |
| 5,321,419 A | 6/1994 | Katakura et al. | |
| 5,321,510 A | 6/1994 | Childers et al. | |
| 5,321,811 A | 6/1994 | Kato et al. | |
| 5,371,847 A | 12/1994 | Hargrove | |
| 5,461,679 A | 10/1995 | Normile et al. | |
| 5,488,385 A * | 1/1996 | Singhal ................. | G06F 3/1431 345/1.1 |
| 5,517,612 A | 5/1996 | Dwin et al. | |
| 5,552,802 A | 9/1996 | Nonoshita et al. | |

(Continued)

FOREIGN PATENT DOCUMENTS

WO 2005026918 3/2005

OTHER PUBLICATIONS

"Epson; EMP Monitor V4, 10 Operation Guide", by Seiko Epson Corp., 2006 http://support.epson.ru/products/manuals/100396/Manual/EMPMonitor.pdf.

(Continued)

*Primary Examiner* — Jason Olson

(57) ABSTRACT

Embodiments are disclosed relating to a method of driving a display panel. In one embodiment, the method includes sending a stream of pixels from a display engine to a first pixel interface and a second pixel interface, transmitting a first subset of the stream of pixels from the first pixel interface to the display panel, and transmitting a second subset of the stream of pixels from the second pixel interface to the display panel.

20 Claims, 4 Drawing Sheets

(56) References Cited

U.S. PATENT DOCUMENTS

| | | | |
|---|---|---|---|
| 5,687,334 A | 11/1997 | Davis et al. | |
| 5,712,995 A | 1/1998 | Cohn | |
| 5,768,164 A | 6/1998 | Hollon, Jr. | |
| 5,781,199 A | 7/1998 | Oniki et al. | |
| 5,841,435 A | 11/1998 | Dauerer et al. | |
| 5,878,264 A | 3/1999 | Ebrahim | |
| 5,900,913 A | 5/1999 | Tults | |
| 5,917,502 A | 6/1999 | Kirkland et al. | |
| 5,923,307 A | 7/1999 | Hogle, IV | |
| 5,963,200 A | 10/1999 | Deering et al. | |
| 5,978,042 A | 11/1999 | Vaske et al. | |
| 6,002,411 A | 12/1999 | Dye | |
| 6,008,809 A | 12/1999 | Brooks | |
| 6,018,340 A | 1/2000 | Butler et al. | |
| 6,025,853 A | 2/2000 | Baldwin | |
| 6,075,531 A | 6/2000 | DeStefano | |
| 6,078,339 A | 6/2000 | Meinerth et al. | |
| 6,118,462 A | 9/2000 | Margulis | |
| 6,175,373 B1 | 1/2001 | Johnson | |
| 6,188,442 B1 | 2/2001 | Narayanaswami | |
| 6,191,758 B1 | 2/2001 | Lee | |
| 6,208,273 B1 | 3/2001 | Dye et al. | |
| 6,226,237 B1 | 5/2001 | Chan et al. | |
| 6,259,460 B1 | 7/2001 | Gossett et al. | |
| 6,337,747 B1 | 1/2002 | Rosenthal | |
| 6,359,624 B1 | 3/2002 | Kunimatsu | |
| 6,388,671 B1 | 5/2002 | Yoshizawa et al. | |
| 6,449,017 B1 | 9/2002 | Chen | |
| 6,473,086 B1 | 10/2002 | Morein et al. | |
| 6,480,198 B2 | 11/2002 | Kang | |
| 6,483,502 B2 | 11/2002 | Fujiwara | |
| 6,498,721 B1 | 12/2002 | Kim | |
| 6,557,065 B1 | 4/2003 | Peleg et al. | |
| 6,567,092 B1 * | 5/2003 | Bowen | G06T 1/20 345/2.1 |
| 6,600,500 B1 | 7/2003 | Yamamoto | |
| 6,606,127 B1 | 8/2003 | Fang et al. | |
| 6,628,243 B1 | 9/2003 | Lyons et al. | |
| 6,630,943 B1 | 10/2003 | Nason et al. | |
| 6,654,826 B1 | 11/2003 | Cho et al. | |
| 6,657,632 B2 | 12/2003 | Emmot et al. | |
| 6,724,403 B1 | 4/2004 | Santoro et al. | |
| 6,753,878 B1 | 6/2004 | Heirich et al. | |
| 6,774,912 B1 | 8/2004 | Ahmed et al. | |
| 6,784,855 B2 | 8/2004 | Matthews et al. | |
| 6,816,977 B2 | 11/2004 | Brakmo et al. | |
| 6,832,269 B2 | 12/2004 | Huang et al. | |
| 6,832,355 B1 | 12/2004 | Duperrouzel et al. | |
| 6,956,542 B2 | 10/2005 | Okuley et al. | |
| 7,007,070 B1 | 2/2006 | Hickman | |
| 7,010,755 B2 | 3/2006 | Anderson et al. | |
| 7,030,837 B1 | 4/2006 | Vong et al. | |
| 7,034,776 B1 | 4/2006 | Love | |
| 7,119,808 B2 | 10/2006 | Gonzalez et al. | |
| 7,124,360 B1 | 10/2006 | Drenttel et al. | |
| 7,129,909 B1 | 10/2006 | Dong et al. | |
| 7,212,174 B2 | 5/2007 | Johnston et al. | |
| 7,269,797 B1 | 9/2007 | Bertocci et al. | |
| 7,359,998 B2 | 4/2008 | Chan et al. | |
| 7,383,412 B1 | 6/2008 | Diard | |
| 7,450,084 B2 | 11/2008 | Fuller et al. | |
| 7,486,279 B2 | 2/2009 | Wong et al. | |
| 7,509,444 B2 | 3/2009 | Chiu et al. | |
| 7,522,167 B1 | 4/2009 | Diard et al. | |
| 7,552,391 B2 | 6/2009 | Evans et al. | |
| 7,558,884 B2 | 7/2009 | Fuller et al. | |
| 7,612,783 B2 | 11/2009 | Koduri et al. | |
| 7,633,505 B1 * | 12/2009 | Kelleher | G06T 1/20 345/502 |
| 8,176,155 B2 | 5/2012 | Yang et al. | |
| 8,766,989 B2 | 7/2014 | Wyatt et al. | |
| 2001/0028366 A1 | 10/2001 | Ohki et al. | |
| 2002/0087225 A1 | 7/2002 | Howard | |
| 2002/0128288 A1 | 9/2002 | Kyle et al. | |
| 2002/0129288 A1 | 9/2002 | Loh et al. | |
| 2002/0140627 A1 | 10/2002 | Ohki et al. | |
| 2002/0163513 A1 | 11/2002 | Tsuji | |
| 2002/0182980 A1 | 12/2002 | Van Rompay | |
| 2002/0186257 A1 | 12/2002 | Cadiz et al. | |
| 2003/0016205 A1 | 1/2003 | Kawabata et al. | |
| 2003/0025689 A1 | 2/2003 | Kim | |
| 2003/0041206 A1 | 2/2003 | Dickie | |
| 2003/0065934 A1 | 4/2003 | Angelo et al. | |
| 2003/0084181 A1 | 5/2003 | Wilt | |
| 2003/0088800 A1 | 5/2003 | Cai | |
| 2003/0090508 A1 | 5/2003 | Keohane et al. | |
| 2003/0122836 A1 | 7/2003 | Doyle et al. | |
| 2003/0126335 A1 | 7/2003 | Silvester | |
| 2003/0188144 A1 | 10/2003 | Du et al. | |
| 2003/0189597 A1 | 10/2003 | Anderson et al. | |
| 2003/0195950 A1 | 10/2003 | Huang et al. | |
| 2003/0197739 A1 | 10/2003 | Bauer | |
| 2003/0200435 A1 | 10/2003 | England et al. | |
| 2003/0222876 A1 | 12/2003 | Giemborek et al. | |
| 2004/0001069 A1 | 1/2004 | Snyder et al. | |
| 2004/0019724 A1 | 1/2004 | Singleton, Jr. et al. | |
| 2004/0027315 A1 | 2/2004 | Senda et al. | |
| 2004/0080482 A1 | 4/2004 | Magendanz et al. | |
| 2004/0085328 A1 | 5/2004 | Maruyama et al. | |
| 2004/0184523 A1 | 9/2004 | Dawson et al. | |
| 2004/0222978 A1 | 11/2004 | Bear et al. | |
| 2004/0224638 A1 | 11/2004 | Fadell et al. | |
| 2004/0225901 A1 | 11/2004 | Bear et al. | |
| 2004/0225907 A1 | 11/2004 | Jain et al. | |
| 2004/0235532 A1 | 11/2004 | Matthews et al. | |
| 2004/0268004 A1 | 12/2004 | Oakley | |
| 2005/0012749 A1 | 1/2005 | Gonzalez et al. | |
| 2005/0025071 A1 | 2/2005 | Miyake et al. | |
| 2005/0052446 A1 | 3/2005 | Plut | |
| 2005/0059346 A1 | 3/2005 | Gupta et al. | |
| 2005/0064911 A1 | 3/2005 | Chen et al. | |
| 2005/0066209 A1 | 3/2005 | Kee et al. | |
| 2005/0073515 A1 | 4/2005 | Kee et al. | |
| 2005/0076088 A1 | 4/2005 | Kee et al. | |
| 2005/0076256 A1 | 4/2005 | Fleck et al. | |
| 2005/0097506 A1 | 5/2005 | Heumesser | |
| 2005/0140566 A1 | 6/2005 | Kim et al. | |
| 2005/0182980 A1 | 8/2005 | Sutardja | |
| 2005/0240538 A1 | 10/2005 | Ranganathan | |
| 2005/0262302 A1 | 11/2005 | Fuller et al. | |
| 2006/0001595 A1 | 1/2006 | Aoki | |
| 2006/0007051 A1 | 1/2006 | Bear et al. | |
| 2006/0010261 A1 | 1/2006 | Bonola et al. | |
| 2006/0085760 A1 | 4/2006 | Anderson et al. | |
| 2006/0095617 A1 | 5/2006 | Hung | |
| 2006/0119537 A1 | 6/2006 | Vong et al. | |
| 2006/0119538 A1 | 6/2006 | Vong et al. | |
| 2006/0119602 A1 | 6/2006 | Fisher et al. | |
| 2006/0125784 A1 | 6/2006 | Jang et al. | |
| 2006/0129855 A1 | 6/2006 | Rhoten et al. | |
| 2006/0130075 A1 | 6/2006 | Rhoten et al. | |
| 2006/0150230 A1 | 7/2006 | Chung et al. | |
| 2006/0164324 A1 | 7/2006 | Polivy et al. | |
| 2006/0200751 A1 | 9/2006 | Underwood et al. | |
| 2006/0232494 A1 | 10/2006 | Lund et al. | |
| 2006/0250320 A1 | 11/2006 | Fuller et al. | |
| 2006/0267857 A1 | 11/2006 | Zhang et al. | |
| 2006/0267987 A1 | 11/2006 | Litchmanov | |
| 2006/0267992 A1 | 11/2006 | Kelley et al. | |
| 2006/0282855 A1 | 12/2006 | Margulis | |
| 2007/0046562 A1 | 3/2007 | Polivy et al. | |
| 2007/0052615 A1 | 3/2007 | Van Dongen et al. | |
| 2007/0067655 A1 | 3/2007 | Shuster | |
| 2007/0079030 A1 | 4/2007 | Okuley et al. | |
| 2007/0083785 A1 | 4/2007 | Sutardja | |
| 2007/0091098 A1 | 4/2007 | Zhang et al. | |
| 2007/0103383 A1 | 5/2007 | Sposato et al. | |
| 2007/0129990 A1 | 6/2007 | Tzruya et al. | |
| 2007/0153007 A1 | 7/2007 | Booth, Jr. et al. | |
| 2007/0195007 A1 | 8/2007 | Bear et al. | |
| 2007/0273699 A1 | 11/2007 | Sasaki et al. | |
| 2008/0130543 A1 | 6/2008 | Singh et al. | |
| 2008/0155478 A1 | 6/2008 | Stross | |
| 2008/0158233 A1 | 7/2008 | Shah et al. | |

(56) References Cited

U.S. PATENT DOCUMENTS

| | | |
|---|---|---|
| 2008/0172626 A1 | 7/2008 | Wu |
| 2008/0297433 A1 | 12/2008 | Heller et al. |
| 2008/0320321 A1 | 12/2008 | Sutardja |
| 2009/0021450 A1 | 1/2009 | Heller et al. |
| 2009/0031329 A1 | 1/2009 | Kim |
| 2009/0059496 A1 | 3/2009 | Lee |
| 2009/0109159 A1 | 4/2009 | Tsai |
| 2009/0153540 A1 | 6/2009 | Blinzer et al. |
| 2009/0160865 A1 | 6/2009 | Grossman |
| 2009/0172450 A1 | 7/2009 | Wong et al. |
| 2009/0193243 A1 | 7/2009 | Ely |
| 2010/0007582 A1 | 1/2010 | Zalewski |
| 2010/0010653 A1 | 1/2010 | Bear et al. |
| 2010/0033433 A1 | 2/2010 | Utz et al. |
| 2010/0033916 A1 | 2/2010 | Douglas et al. |
| 2010/0085280 A1 | 4/2010 | Lambert et al. |
| 2010/0091025 A1 | 4/2010 | Nugent et al. |
| 2011/0102446 A1 | 5/2011 | Oterhals et al. |
| 2011/0141133 A1 | 6/2011 | Sankuratri et al. |
| 2011/0157334 A1 | 6/2011 | Kim et al. |
| 2012/0026157 A1 | 2/2012 | Unkel et al. |
| 2012/0108330 A1 | 5/2012 | Dietrich, Jr. et al. |
| 2012/0162238 A1 | 6/2012 | Fleck et al. |
| 2012/0268480 A1 | 10/2012 | Cooksey et al. |
| 2014/0085437 A1 | 3/2014 | Unkel et al. |
| 2014/0118371 A1* | 5/2014 | Kondo .................. G09G 3/3688 345/530 |
| 2014/0168229 A1 | 6/2014 | Ungureanu et al. |
| 2014/0184611 A1 | 7/2014 | Wyatt et al. |
| 2014/0184629 A1 | 7/2014 | Wyatt et al. |

OTHER PUBLICATIONS

"Virtual Network Computing", http://en.wikipedia.org/wiki/Vnc, Downloaded Circa: Dec. 18, 2008, pp. 1-4.

Andrew Fuller; "Auxiliary Display Platform in Longhorn"; Microsoft Corporation; The Microsoft Hardware Engineering conference Apr. 25-27, 2005; slides 1-29.

McFedries, ebook, titled "Complete Idiot's Guide to Windows XP", published Oct. 3, 2001, pp. 1-7.

PCWorld.com, "Microsoft Pitches Display for Laptop Lids" dated Feb. 10, 2005, pp. 1-2, downloaded from the Internet on Mar. 8, 2006 from http://www.pcworld.com/resources/article/aid/119644.asp.

Vulcan, Inc., "Product Features: Size and performance", p. 1; downloaded from the internet on Sep. 20, 2005 from http://www.flipstartpc.com/aboutproduct_features_sizeandpower.asp.

Vulcan, Inc., "Product Features:LID Module", p. 1, downloaded from the Internet on Sep. 19, 2005 from http://www.flipstartpc.com/aboutproduct_features_lidmodule.asp.

Vulcan, Inc., "Software FAQ", p. 1, downloaded from the internet on Sep. 20, 2005 from http://www.flipstartpc.com/faq_software.asp.

"System Management Bus (SMBus) Specification," Version 2.0, Aug. 3, 2000; pp. 1-59.

Handtops.com, "FlipStart PC in Detail" pp. 1-4, downloaded from the internet o Sep. 20, 2005 from http://www.handtops.com/show/news/5.

Microsoft Corporation, "Microsoft Windows Hardware Showcase", dated Apr. 28, 2005; pp. 1-5; downloaded from the internet on Sep. 15, 2005, from http://www.microsoft.com/whdc/winhec/hwshowcase05.mspx.

Paul Thurrot's SuperSite for Windows, "WinHEC 2004 Longhorn Prototypes Gallery", dated May 10, 2004, pp. 1-4, Downloaded from the internet on Sep. 15, 2005 from http://www.sinwupersite.com/showcase. loghorn_winhc_proto.asp.

"The Java Tutorial: How to Use Combo Boxes", Archived Mar. 5,2006 by archive.org, Downloaded Jun. 30, 2011, http://web.archive.org/web/20050305000852/http://www-mips.unice.fr/Doc/Java/Tutorial/uiswing/components/combobox.html.

Vulcan Inc., "Connectivity FAQ", p. 1, downloaded from the internet on Sep. 20, 2005 from http://www.flipstartpc.com/faq_connectivity.asp.

"Usage: NVIDIA GeForce 6800—PCIe x16", Dell, archived Jan. 15, 2006 by archive.org, Downloaded Jun. 29, 2011, http://web.archive.org/web/20060115050119/http://support.dell.com/support/edocs/video/P82192/en/usage.html.

"Graphics: Intel® 82852/82855 Graphics Controller Family", Intel, Archived Nov. 2, 2006 by archive.org, Downloaded Jun. 30, 2011, http://web.archive.org/web/20061103045644/http://www.intel.com/support/graphics/intel852gm/sb/CS-009064.html.

Texas Instruments, "TMS320VC5501/5502 DSP Direct Memory Access (DMA) Controller Reference Guide", Sections 1, 2, 4, 11, and 12; Literature No. SPRU613G, Mar. 2005.

* cited by examiner

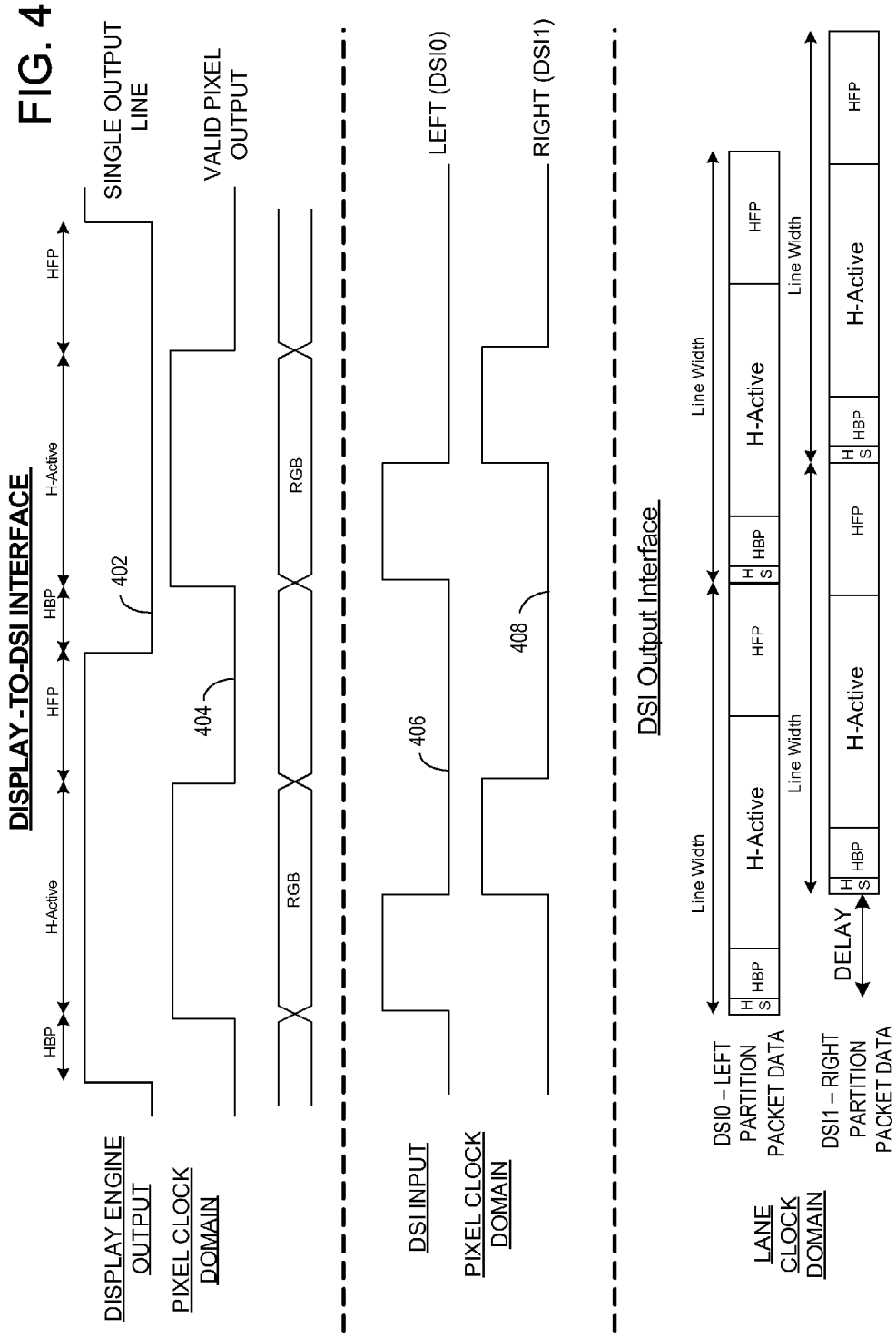

PIXEL DATA TRANSMISSION OVER MULTIPLE PIXEL INTERFACES

BACKGROUND

Pixel data is often transmitted to a display panel via a Display Serial Interface (DSI), which is a display panel standard source-to-panel pixel interface typically used in mobile computing devices such as tablets and smart phones that may also be utilized in larger-format computing devices such as laptops and desktop computers. The specification for this standard interface allows for one clock lane and up to four data lanes, each of the data lanes typically having a maximum data rate of 1 Gbps. A DSI having the maximum number of lanes driven at the maximum data rate includes enough bandwidth to drive panels having resolutions of 1920×1200 at a 60 Hz refresh rate. However, as display panel resolutions increase, the maximum number of data lanes and maximum data rate per lane in the existing DSI standard described above will no longer be capable of driving panels at desired resolutions.

BRIEF DESCRIPTION OF THE DRAWINGS

FIG. 4 is a diagram of transmission timings for pixels having a left/right split entering and leaving a first source-to-panel pixel interfaces and a second source-to-panel pixel interfaces in accordance with an embodiment of the present disclosure.

DETAILED DESCRIPTION

Pixel data provided to a source-to-panel pixel interface, such as a Display Serial Interface (DSI), is transmitted to a panel, such as a display panel for a mobile device. Pixel data may be transmitted via a single communication line to the panel or via multiple data lanes. The number of data lanes and the data rate of each data lane dictates the maximum panel resolution that can be supported by the DSI. As discussed above, increasing the data rate of each data lane would require changes to the existing DSI specification, or a shift to a new standard. Both scenarios are undesirable and likely would require substantial hardware and/or software changes. In order to increase bandwidth in display system transmissions while maintaining a low-power DSI using accepted standard components, embodiments are disclosed herein for increasing the number of DSI lanes in a display system by transmitting pixel data from a display engine to a first and a second DSI for driving a display panel. The two DSIs may operate under a cooperative control regime, also referred to as a ganged mode, to effectively split a pixel stream from a display engine, allocate portions of the pixel stream to each DSI controller, and then reassemble the split streams for delivery to one or more display panels. A display system in accordance with the present disclosure having two standardized DSIs with four data lanes each can support, for example, display resolutions reaching 2560×1600 at a 60 Hz refresh rate.

Figure 1:
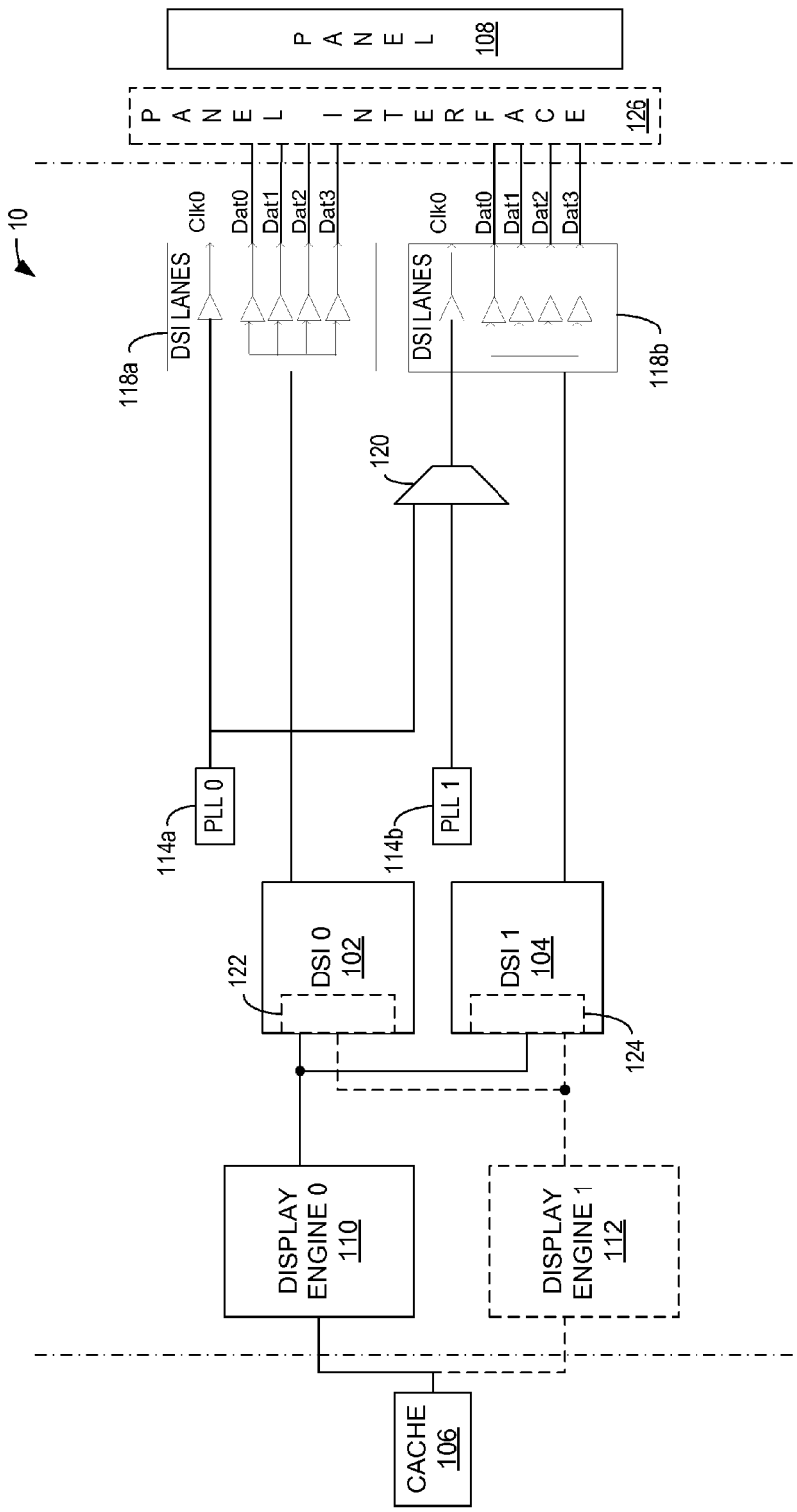
FIG. 1 is a block diagram depicting a video path through a display system including two source-to-panel pixel interfaces in accordance with an embodiment of the present disclosure.

FIG. 1 shows an example display system 10 including a first DSI 102 and a second DSI 104. While embodiments are described herein in reference to one or more DSIs, it is to be understood that any suitable source-to-panel pixel interface may be utilized as an alternative or in addition to a DSI. For example, a pixel interface may be configured to receive a stream of pixels and/or pixel data from one or more display engines and transmit a subset of the stream of pixels and/or pixel data to a display panel (e.g., directly to a display panel or through one or more intermediary components to a display panel). A graphics processing unit (GPU) may create an image model in memory cache 106 including data for each pixel of an image to be shown on a panel 108. A display engine 110 is connected to the memory cache 106 in order to fetch the pixel data from cache lines of the memory cache 106. Although a memory cache 106 is illustrated herein, it is to be understood that the display engine 110 may receive pixel data from any suitable source. As illustrated in FIG. 1, the display system 10 may include a second display engine 112 for driving a second panel. This arrangement may be extended to accommodate three or more display engines and associated display panels.

The display engine 110 is communicatively connected to both the first DSI 102 and the second DSI 104 such that an entire stream of pixels from the display engine 110 is transmitted to each of the first DSI 102 and the second DSI 104. Any additional display engines, such as the second display engine 112, are also connected to both DSIs 102 and 104 to transmit an entire pixel stream thereto. The pixel data received and/or retrieved by the display engine 110 may be provided/retrieved in a pitch mode (e.g., pixel-by-pixel and line-by-line) or grouped (e.g., pixels are transmitted and/or retrieved in groups). The pixel data sent from the display engine 110 to each of the first DSI 102 and the second DSI 104 typically is transmitted in pitch mode. In some embodiments the pixel data is ordered to represent pixels line-by-line starting from a top left of the display panel 108 and traversing left to right until the bottom right corner is reached. However, the order of pixel data retrieved from the cache 106, transmitted by the display engine 110, and/or transmitted by the DSIs 102 and 104 may be configurable to start at any desired point of the screen, traverse the screen in any desired pattern, and/or perform partial updates of the panel.

The pixel data output from the display engine 110 may be temporarily buffered in the display engine 110 and is transmitted at a pixel clock rate. The pixel clock rate transmits pixels at a per-pixel rate (e.g., a pixel or number of pixels is/are transmitted with each clock pulse). In contrast, a lane clock, also referred to as a byte clock or a DSI clock, governing the transmission of data from the first and second DSIs 102 and 104 may operate at a per-byte rate (e.g., a byte or number of bytes is/are transmitted with each clock pulse). For example, phase-locked loops (PLL) 114a and 114b, including divider circuits internal thereto, may provide clock timing pulses for each clock of the DSI lane blocks 118a and 118b. As illustrated, the lane clocks utilize different clocks, but are derived from a common phase-locked loop (e.g., a signal derived from PLL 114b may be combined with a signal from PLL 114a at a multiplexer 120), however, it is to be understood that the DSI lanes may share the same clock in some embodiments. The lane clocks and the pixel clocks are also derived from a common PLL. The clock timing pulses for the DSI lane blocks may be adjusted based on a data rate requirement. In particular, the byte clock multiplied by the number of DSI lanes may be configured to match a number of pixels to be sent multiplied by the number of bytes per pixel.

Each DSI may include an asynchronous interface in the form of a line buffer 122 and 124 to allow the DSI to transmit pixel data at a different clock rate than that of the display engine. In this way, the line buffers 122 and 124 act as a synchronization mechanism between the pixel clock of the pixel stream received from the display engine 110 and the lane clock governing transmissions from the DSIs. The line buffers 122 and 124 may also be utilized to delay transmission of pixel data to the panel such that the transmission is aligned to meet panel alignment specifications. For example, one or more of the DSIs may store a subset of received pixel data in a respective line buffer to delay pixel data transmission to the display panel in accordance with a specification of a particular display panel.

As shown in FIG. 1, the pixel data from the DSI lane blocks 118*a* and 118*b* may be sent to a panel interface 126 before being passed to a display panel 108. The recombining of pixel data from the plurality of data lanes may thus be performed by the panel interface 126 and/or the display panel 108. The recombined pixel data may then be utilized to drive the panel to display an image corresponding to the image model created by the GPU in the memory cache 106.

Figure 2:
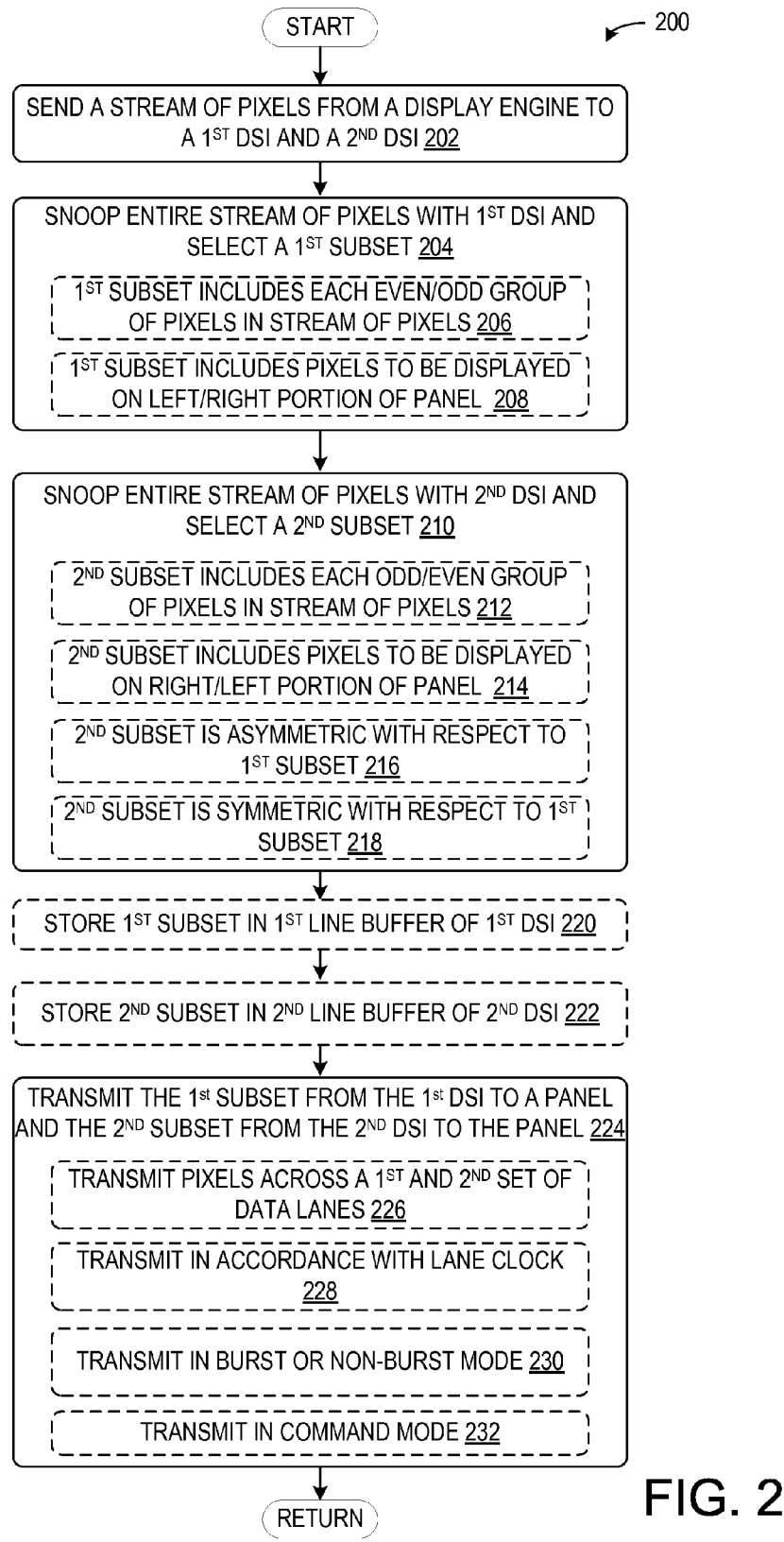
FIG. 2 is a flow chart of a method of driving a display panel with a first and a second source-to-panel pixel interfaces in accordance with an embodiment of the present disclosure.

FIG. 2 shows a method 200 of driving a display panel with data from a first DSI and a second DSI, such as the first and second DSIs 102 and 104 illustrated in FIG. 1. As discussed above with respect to FIG. 1, although method 200 is described with reference to multiple DSIs, the method may utilize source-to-panel interfaces other than DSIs in some embodiments. The method 200 includes sending a stream of pixels from a display engine to a first DSI and a second DSI at 202. In other words, the display engine sends the same pixel data to both the first and the second DSI. The display engine may send the pixel data in accordance with a pixel clock. The first DSI may snoop or otherwise analyze the entire stream of pixels to select a first subset of pixels at 204.

In some embodiments, the first subset of pixels includes each even or odd group of pixels in the stream of pixels, as indicated at 206. For example, the first DSI may select every other pixel in the pixel stream, or every other group of pixels in the pixel stream. The pixels and/or pixel groups may be marked as even or odd in order to be differentiated when snooped by the DSIs. Alternatively, the first subset may include pixels to be displayed on a left or right portion of a display panel, or otherwise correspond to a sequential or selected subset portion of the data, as indicated at 208. For example, pixels 0 through N of a pixel stream may be used to define an image on a left portion of a display panel and selected by the first DSI, while pixels N-2559 may be used to define an image on a right portion of a display panel and ignored by the first DSI. It is to be understood that any suitable splitting and/or allocation configurations may be used alternatively or in addition to odd/even or left/right splitting.

The data that is ignored by the DSI may not be allowed to be stored or otherwise transmitted by the DSI. At a substantially simultaneous period in time, a second DSI may snoop the entire stream of pixels and select a second, different subset of pixels, as indicated at 210. The second subset of pixels selected by the second DSI may include each odd or even group of pixels in the stream of pixels, as indicated at 212, or pixels to be displayed on a right or left portion of a panel, or otherwise correspond to another sequential or selected subset portion of the data, as indicated at 214.

It is to be understood that even/odd or left/right selections are interchangeable across the DSIs. In other words, even groups of pixels may be transmitted by the first DSI while odd groups of pixels are transmitted by the second DSI, or odd groups of pixels may be transmitted by the second DSI while even groups of pixels are transmitted by the first DSI. Likewise, a left portion of video data may be transmitted by the first DSI while a right portion of video data is transmitted by the second DSI, or the left portion of video data may be transmitted by the second DSI while the right portion of video data is transmitted by the first DSI. Accordingly, the first subset and the second subset may include different pixels from one another, and collectively include each pixel from the entire stream of pixels from the display engine. It is to be understood that pixels may be transmitted in accordance with any suitable subset.

The second subset may be asymmetric with respect to the first subset, as indicated at 216, or symmetric with respect to the first subset, as indicated at 218. For example, the second subset may include more or fewer pixels than the first subset if the DSI lanes for each DSI have different power considerations. With an asymmetric grouping, a DSI that selects the smaller subset (e.g., the subset with fewer pixels and/or less pixel data) may utilize fewer lanes to conserve power, as any data lanes that are not being utilized to transmit pixel data may be set to a low power state. Accordingly, each data lane may be powered based on a data rate associated with the stream of pixels.

Upon selecting a first subset, the first DSI may store the pixel data from the first subset in a first line buffer, as indicated at 220. Likewise, the method may include storing the second subset in a second line buffer of the second DSI at 222. The selected and/or stored pixel data may then be transmitted from the first and second DSI to a panel at 224. As discussed above with respect to FIG. 1, the pixel data may be transmitted to the panel via a panel interface such that the panel and/or the panel interface combines the pixel data from the first and second subsets in order to recreate the stream of pixels originally transmitted from the display engine at 202. As indicated at 226, the pixels may be transmitted across a first and second set of data lanes, such as the data lanes in data lane blocks 118*a* and 118*b* of FIG. 1. The first and second set of data lanes may include four lanes each, however some of the data lanes may be in a low power mode such that data is transmitted via fewer than four lanes in one or more of the DSI lane blocks. The pixels may be transmitted to the panel in accordance with a lane clock, as indicated at 228. In some embodiments, the lane clock may be asynchronous to the pixel clock governing transmissions from the display engine to the DSIs.

The configuration of the first and second DSI supports many different modes of display transfer. Pixels transmitted from the first and second DSIs may be transmitted in a video mode (e.g., a non-burst or a burst mode) in which pixel data is transferred from a host (e.g., a display engine and/or DSI) to a panel in real time, as indicated at 230. DSI lanes transmitting the pixel data typically operate at either a high speed mode or a low power mode. In a non-burst mode of the video mode, DSI lanes remain at a high speed mode during the entirety of an active transmission portion (e.g., an H-Active output). As the last byte of the last pixel of a pixel stream is to be aligned with the number of lanes that are being used in the DSI in the non-burst mode, active pixels may be padded to ensure such alignment while transmitting in the non-burst mode. For example, padding bytes added to the data output via the DSI lanes (e.g., as part of the horizontal front porch of a horizontal blanking interval) may be undefined such that the panel and/or panel interface ignores the content of the padding bytes upon receipt. Accordingly, one or more padding bytes may be transmitted with the pixel data from the first and/or second DSI to align a last byte of a last pixel of the pixel stream (e.g., the last byte of the last pixel selected by the second DSI) with a last data lane being used in transmission (e.g., the last data lane Dat3 of the second DSI block 118*b*). For embodiments in which only a portion of the data lanes of the first and/or second DSI block is utilized for transmission (e.g., if only two data lanes, Dat0 and Dat1, from the DSI block 118*b* are utilized), the padding byte(s) may be transmitted in order to ensure that the last byte of the last pixel of the pixel stream is transmitted via the last DSI lane utilized (e.g., Dat1 of DSI block 118*b*). In a burst mode of the video mode, data is transmitted at a higher data rate in order to enable one or more data lanes to enter a low power mode during at least a portion of the active transmission (e.g., H-Active). As indicated at 232, the transmission may be performed in a command mode, in which all data from the DSI lanes is pushed into a line buffer at a panel and/or panel interface based on a vertical sync signal.

Figure 3:
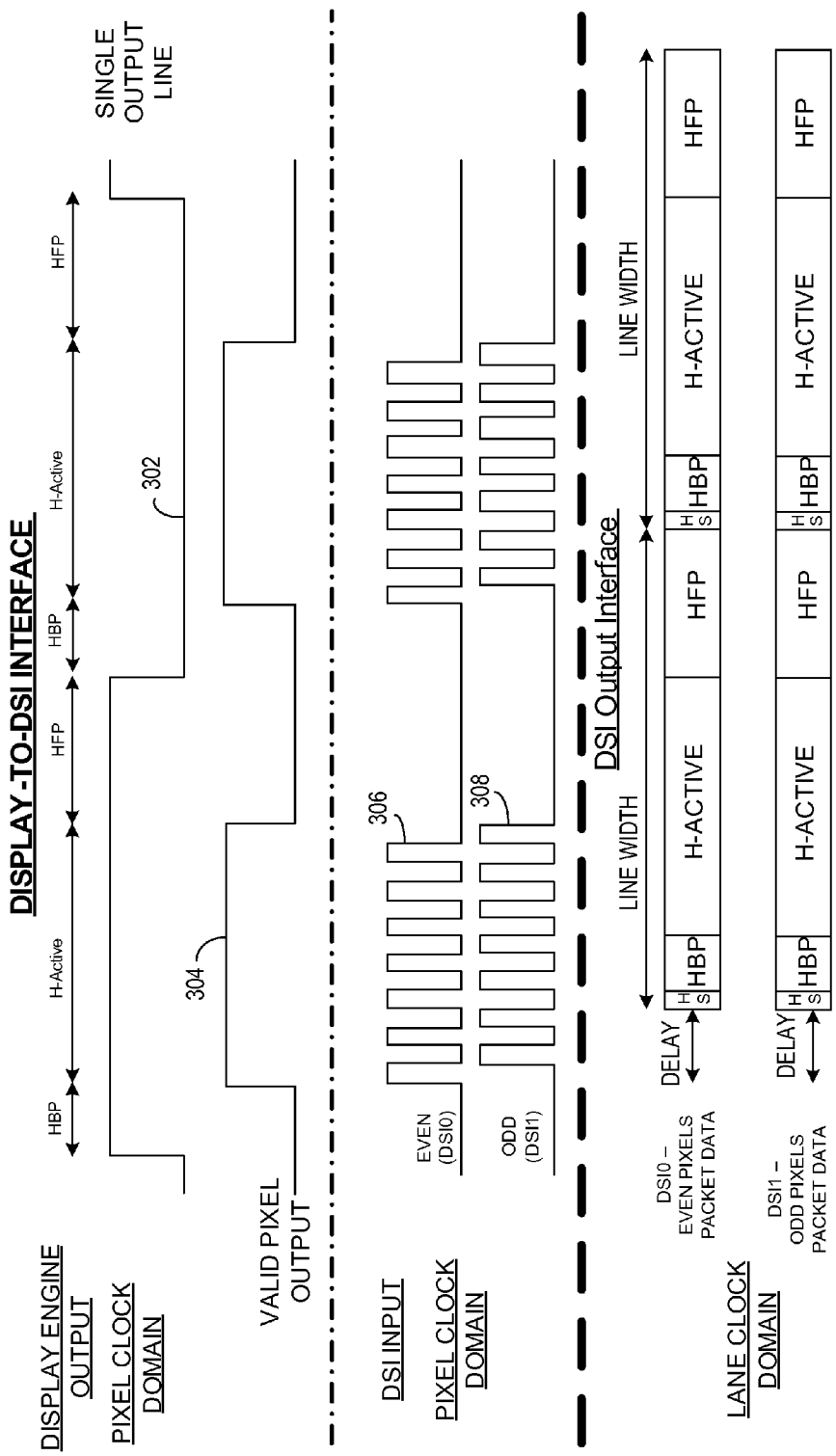
FIG. 3 is a diagram of transmission timings for pixels having an odd/even split entering and leaving a first source-to-panel pixel interfaces and a second source-to-panel pixel interfaces in accordance with an embodiment of the present disclosure.

FIGS. 3 and 4 show diagrams for transmission timings for pixels that are snooped according to odd/even splits (FIG. 3) and left/right splits (FIG. 4). Turning first to FIG. 3, a single output line from a display engine to first and second DSIs (DSI 0 and DSI 1) is shown at 302. The single output line 302 corresponds to the total time dedicated to outputting data for a single line of a display panel, including timing for blanking and positioning a line for writing the pixel data to the panel. For example, the single output line 302 switches between high and low to signify a change from a first line width to a second line width, each line width including a horizontal back porch, an H-active region, and a horizontal front porch. As shown at 304, valid pixel output from the display engine to the first and second DSIs only occurs during the H-active region. In other words, the actual pixel data from the display engine is only output to the DSIs during the H-active region. Logical high regions of the valid pixel output 304 correspond to the overall pixel data sent to the first and second DSIs in the pixel clock domain. The DSI input selected by each DSI is shown at 306 (for a first DSI) and 308 (for a second DSI). As illustrated, the logical high regions of 306 and 308 are staggered to represent the first DSI selecting data for each even pixel and the second DSI selecting data for each odd pixel. The combinations of the even and odd pixel data form the H-Active regions of valid pixel output 304. As the even and odd pixel data of 306 and 308 is received at an input of each DSI, the pulses are timed in accordance with the pixel clock domain.

The bottom portion of FIG. 3 corresponds to DSI output interfaces for each of the first and second DSI. As the packet data illustrated in this portion of FIG. 3 corresponds to the output of the DSI, the data is transmitted in the lane clock domain. The packet structure is similar to the line width discussed above with respect to the single output line 302, as the line width includes a horizontal sync to signal a start of a new line, a horizontal back porch, an H-active region, and a horizontal front porch. Further, each packet may be transmitted with a programmable delay responsive to line buffering in order to ensure synchronicity between the pixel clock domain and the lane clock domain. As illustrated, the packet structure is the same for each of the DSIs, however in the H-Active region of the packet for the first DSI includes even pixel packet data, while the H-Active region of the packet for the second DSI includes odd pixel packet data.

FIG. 4 illustrates similar information to FIG. 3 with respect to pixel data that is split into left/right portions. Single output line 402 and valid pixel output 404 correspond to single output line 302 and valid pixel output 304 of FIG. 3. However, in this example, the pixel data selected by each DSI corresponds to a sequential portion of the pixel data associated with a left portion of the display panel (shown at line 406) and a right portion of the display panel (shown at line 408). As the data is sequential, only the DSI output for the right portion may be delayed with a programmable delay, as the entirety of the left portion is transmitted to the panel prior to transmitting the right portion.

By utilizing two DSIs of a display system in a ganged mode configuration, such that pixel data is provided by both DSIs to a panel, the effective bandwidth of the display system is increased in comparison to a single DSI configuration. The additional DSI data lanes of the second DSI enable a greater amount of data transfer as well as flexibility with respect to power requirements and functionality of each DSI. For example, commands and video may be handled independently per DSI or simultaneously across both DSIs and each DSI may read and/or write data independently from one another (e.g., simultaneous read on one DSI and write on another). By maintaining the standardization associated with each DSI, the display system may be compatible with existing devices and continue to provide multiple modes of functionality, including burst and non-burst video mode transfers, and command mode transfers. Accordingly, the display system is capable of supporting panels having higher resolutions than those supported by single DSI configurations without sacrificing functionality.

It will be readily apparent that the transaction ordering examples described herein may be implemented on any type of computing system, such as display system 10 in FIG. 1. A display engine (e.g., display engine 110 of FIG. 1), DSI (e.g., DSIs 102 and 104 of FIG. 1), and/or executable instructions stored on a memory device and/or a data-holding subsystem (e.g., memory cache 106 of FIG. 1) of the display system, the DSI, and/or the display engine may be configured to perform the data transmission and panel driving methods described herein. For example, processing logic (e.g., display engine 110 and/or DSIs 102 and 104 of FIG. 1) may be configured to execute the instructions to perform the transaction ordering. In addition to or instead of executable instructions, the processing logic hardware of the computing system itself may include hardware operative to provide the ordering functionality described herein.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered, performed in parallel or omitted without departing from the scope of the present disclosure. Further, it will be appreciated that the methods described herein may be performed using any suitable software and hardware in addition to or instead of the specific examples described herein. This disclosure also includes all novel and non-obvious combinations and sub-combinations of the above systems and methods, and any and all equivalents thereof.

The invention claimed is:

1. A method of driving a display panel, the method comprising:
   sending a stream of pixels from a display engine to both a first pixel interface and a second pixel interface;
   transmitting a first subset of the stream of pixels from the first pixel interface to the display panel; and
   transmitting a second subset of the stream of pixels from the second pixel interface to the display panel,
   wherein the stream of pixels is sent from the display engine to both the first pixel interface and the second pixel interface in accordance with a pixel clock; and
   transmitting the first subset and the second subset of the stream of pixels in accordance with a lane clock, the pixel clock being asynchronous to the lane clock.

2. The method of claim 1, wherein: transmitting a first subset of the stream of pixels comprises transmitting the first subset of the stream of pixels from the first pixel interface across a first set of data lanes; and transmitting a second subset of the stream of pixels comprises transmitting the second subset of the stream of pixels from the second pixel interface across a second set of data lanes.

3. The method of claim 2, further comprising selectively powering data lanes of the first set of data lanes and the second set of data lanes based on a data rate associated with the stream of pixels.

4. The method of claim 2, further comprising transmitting one or more padding bytes with one of the first subset and the second subset to align a last byte of a last pixel in the second subset with a last data lane in the second set of data lanes.

5. The method of claim 1, further comprising snooping the stream of pixels with the first pixel interface to select the first subset and snooping the stream of pixels with the second pixel interface to select the second subset.

6. The method of claim 5, wherein the first subset comprises even groups of pixels in the stream of pixels and the second subset comprises odd groups of pixels.

7. The method of claim 5, wherein the first subset comprises pixels to be displayed on a first side portion of the panel and the second subset comprises pixels to be displayed on a second side portion of the panel, wherein the first side portion and the second right portion are exclusive to each other.

8. The method of claim 5, wherein the second subset is asymmetric with respect to the first subset in terms of pixel quantity.

9. The method of claim 1, wherein the first pixel interface is a first display serial interface (DSI) and the second pixel interface is a second DSI.

10. A method of driving a display panel, the method comprising:
    sending a stream of pixels from a display engine to both a first display serial interface (DSI) and a second DSI;
    selecting a first subset of the stream of pixels at the first DSI;
    selecting a second subset of the stream of pixels at the second DSI;
    transmitting the first subset of the stream of pixels from the first DSI to the display panel; and
    transmitting the second subset of the stream of pixels from the second DSI to the display panel,
    wherein transmitting the first subset of the stream of pixels comprises transmitting the first subset across at least one data lane of the first set of data lanes and setting the at least one data lanes a low power mode.

11. The method of claim 10, wherein the first subset comprises pixels to be displayed on a left portion of the display panel and the second subset comprises pixels to be displayed on a right portion of the display panel, wherein the left portion and the right portion are exclusive of each other.

12. The method of claim 10, wherein the first subset comprises odd groups of pixels in the stream of pixels and the second subset comprises even groups of pixels in the stream of pixels.

13. A method of driving a display panel, the method comprising:
    sending a stream of pixels from a display engine to both a first pixel interface and a second pixel interface;
    transmitting a first subset of the stream of pixels from the first pixel interface to the display panel;
    transmitting a second subset of the stream of pixels from the second pixel interface to the display panel,
    wherein: transmitting a first subset of the stream of pixels comprises transmitting the first subset of the stream of pixels from the first pixel interface across a first set of data lanes; and transmitting a second subset of the stream of pixels comprises transmitting the second subset of the stream of pixels from the second pixel interface across a second set of data lanes; and
    selectively powering data lanes of the first set of data lanes and the second set of data lanes based on a data rate associated with the stream of pixels.

14. The method of claim 13, wherein the first pixel interface is a first display serial interface (DSI) and the second pixel interface is a second DSI.

15. The method of claim 13, further comprising snooping the stream of pixels with the first pixel interface to select the first subset and snooping the stream of pixels with the second pixel interface to select the second subset.

16. The method of claim 15, wherein the first subset comprises even groups of pixels in the stream of pixels and the second subset comprises odd groups of pixels.

17. The method of claim 15, wherein the first subset comprises pixels to be displayed on a first side portion of the panel and the second subset comprises pixels to be displayed on a second side portion of the panel, wherein the first side portion and the second right portion are exclusive to each other.

18. The method of claim 15, wherein the second subset is asymmetric with respect to the first subset in terms of pixel quantity.

19. A method of driving a display panel, the method comprising:
    sending a stream of pixels from a display engine to both a first pixel interface and a second pixel interface;
    transmitting a first subset of the stream of pixels from the first pixel interface to the display panel;
    transmitting a second subset of the stream of pixels from the second pixel interface to the display panel,
    wherein: transmitting a first subset of the stream of pixels comprises transmitting the first subset of the stream of pixels from the first pixel interface across a first set of data lanes; and transmitting a second subset of the stream of pixels comprises transmitting the second subset of the stream of pixels from the second pixel interface across a second set of data lanes; and
    transmitting one or more padding bytes with one of the first subset and the second subset to align a last byte of a last pixel in the second subset with a last data lane in the second set of data lanes.

20. The method of claim 19, wherein the first pixel interface is a first display serial interface (DSI) and the second pixel interface is a second DSI.

* * * * *